(12) United States Patent
Mu

(10) Patent No.: US 10,882,662 B2
(45) Date of Patent: Jan. 5, 2021

(54) FOLDABLE LIQUID CONTAINER WITH SUPPORTING FRAME

(71) Applicant: Mengmeng Mu, Ningbo (CN)

(72) Inventor: Mengmeng Mu, Ningbo (CN)

( * ) Notice: Subject to any disclaimer, the term of this patent is extended or adjusted under 35 U.S.C. 154(b) by 276 days.

(21) Appl. No.: 16/041,822

(22) Filed: Jul. 22, 2018

(65) Prior Publication Data

US 2019/0375539 A1 Dec. 12, 2019

(30) Foreign Application Priority Data

Jun. 6, 2018 (CN) .......................... 2018 1 0575375
Jun. 6, 2018 (CN) ..................... 2018 2 0871354 U
Jun. 6, 2018 (CN) ..................... 2018 2 0871648 U
Jun. 6, 2018 (CN) ..................... 2018 2 0871770 U

(51) Int. Cl.
| B65D 21/08 | (2006.01) |
| B65D 6/18 | (2006.01) |
| B65D 25/24 | (2006.01) |
| B65D 5/20 | (2006.01) |
| A47B 3/091 | (2006.01) |
| D06F 95/00 | (2006.01) |

(52) U.S. Cl.
CPC ............ B65D 21/086 (2013.01); A47B 3/091 (2013.01); B65D 7/26 (2013.01); B65D 25/24 (2013.01); B65D 5/20 (2013.01); D06F 95/002 (2013.01)

(58) Field of Classification Search
CPC .... A01K 13/001; B65D 21/086; B65D 25/24; A45F 3/24; A47B 3/091; D09F 95/002; D09F 95/004

USPC ................ 248/168, 169, 170, 171, 150, 439
See application file for complete search history.

(56) References Cited

U.S. PATENT DOCUMENTS

| 2,875,806 | A | * | 3/1959 | Block | ................... D06F 95/002 |
| | | | | | 248/150 |
| 3,026,160 | A | * | 3/1962 | Bisp | ..................... A47B 3/0918 |
| | | | | | 108/132 |
| 3,893,648 | A | * | 7/1975 | Gilbert | ................ B65B 67/1255 |
| | | | | | 248/97 |
| 4,022,414 | A | * | 5/1977 | Egger | .................. D06F 95/002 |
| | | | | | 248/150 |
| 4,728,118 | A | * | 3/1988 | Haas | ...................... F16M 11/38 |
| | | | | | 108/119 |

FOREIGN PATENT DOCUMENTS

CN            207202585     *    4/2018

* cited by examiner

*Primary Examiner* — Fenn C Mathew
*Assistant Examiner* — Jennifer Castriotta
(74) *Attorney, Agent, or Firm* — Raymond Y. Chan; David and Raymond Patent Firm

(57) ABSTRACT

A foldable liquid container includes a foldable supporting frame, a foldable container body arranged on the foldable supporting frame, and a switch device arranged on the foldable supporting frame to be operated to transform the foldable supporting frame between an unfolded mode and a folded mode in a single puling operation. The foldable container body is able to be folded with the folding of the foldable supporting frame. The foldable supporting frame is supported and secured in the unfolded mode by means of the switch device, wherein the switch device can be operated to release the engagement of the foldable supporting frame while transforming from the unfolded mode to the folded mode.

20 Claims, 14 Drawing Sheets

FOLDABLE LIQUID CONTAINER WITH SUPPORTING FRAME

CROSS REFERENCE OF RELATED APPLICATION

This is a non-provisional application that claims the benefit of priority under 35U.S.C. § 119 to Chinese applications, application number 201810575375.9, filed Jun. 6, 2018, application number 201820871770.7, filed Jun. 6, 2018, application number 201820871648.X, filed Jun. 6, 2018, and application number 201820871354.7, filed Jun. 6, 2018, which entire contents are expressly incorporated herein by references.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a foldable appliance, and more particularly to a foldable liquid container comprising a liquid container body and a liquid container supporting frame which are equipped in a foldable manner that they are able to be folded and unfolded together by a single pulling operation.

Description of Related Arts

Household rigid container, especially large size receptacle, is popular to be used as basin, bathtub or swimming pool for bathing, cleaning or playing purpose. Since this kind of container needs to have space large enough to hold at least a child or pet inside while having enough space to contain water or cleaning liquid, the conventional container is generally made in larger size. This kind of rigid container is convenient for most families to enable one to use water in somewhere desired. But, the conventional liquid containers also take wider space for using water, usually in outdoor area or bathroom.

Even though such relatively large container is not required to be used everyday, it is bulky for storage and carrying when it is not in use. The conventional container is usually made of plastic integrally in one piece. Some containers are made inflatable which have to be kept indoors to avoid sun and rain and prevent plastic aging. In other words, the owner of the conventional container is required to reserve a relatively large space for storing the rigid container. Therefore, a lot of users will also store various stuffs inside the rigid container to save storing space but it is also very troublesome to remove the stuffs inside the container before the next use of the rigid container.

One of the disadvantages of the conventional rigid container is that cleaning the container is laborious. Before using or after using, the container has to be cleaned for hygienic problem. Not only inside the container, but outside the container is required to be cleaned carefully. Otherwise, the container will be a wonderful incubation chamber for bacteria. Any residual liquid in the bowl shaped conventional container is a good environment for growing germs.

The drawback of the conventional inflatable container is the need to be inflated before every usage, that requires an extra air pump to complete. Generally, more than five minutes is needed to set the container in predetermined place, to open up, to inflate air and so on. Once the skin of the inflatable container is cracked, such as there is a hole in the container, the container becomes non-inflatable. If the size of the hole is small, it is hardly to be found for patching and time consuming to find out where is the air leaking. It requires much more time to sealedly patch a larger hole or even it is non-repairable but to abandon the container with no choice when it is seriously damaged.

Another disadvantage is that the container is made to be placed on the ground while using. Thus, the height of the container requires the user to bend down or squat by its side when using the container. In addition, the liquid contained in the container may also face risks of being polluted by soil or dirt on the ground that adversely affects the lumbar health of the user and the sanitation of cleaning or playing.

SUMMARY OF THE PRESENT INVENTION

The invention is advantageous in that it provides a foldable liquid container with supporting frame, wherein a foldable liquid container body is equipped with a foldable supporting frame in such a manner that the liquid container body can also be folded up by folding up the supporting frame through a single pulling operation for easy storing.

Another advantage of the invention is to provide a foldable liquid container with supporting frame, wherein the foldable liquid container body is able to be unfolded simply by unfolding the foldable supporting frame and supported securely at a desired height by the unfolded supporting frame.

Another advantage of the invention is to provide a foldable liquid container with supporting frame, wherein the foldable liquid container body and the foldable supporting frame are equipped to be folded up together to minimize their sizes to save storage space when they are not using for ease of storage and carrying.

Another advantage of the invention is to provide a foldable liquid container with supporting frame, wherein the foldable liquid container body has a larger size while unfolded for usage and a smaller size when it is folded up for storage and carrying.

Another advantage of the invention is to provide a foldable liquid container with supporting frame, wherein the supporting frame is capable of being folded up by a single pulling operation while the foldable liquid container body is folded up by the folding up supporting frame as well at the same time automatically, such that no extra force or operation step is needed to fold up the liquid container independently.

Another advantage of the invention is to provide a foldable liquid container with supporting frame, wherein the liquid container body is capable of being unfolded by a single pulling operation of the supporting frame, such that no extra force or operation step is needed to unfold and set up the foldable liquid container body and the foldable supporting frame at the same time for containing water or cleaning liquid inside the liquid container body.

Another advantage of the invention is to provide a foldable liquid container with supporting frame, wherein the foldable liquid container body is easily to be stored after pulling to fold to minimize its size such that multiple folded liquid containers are able to be stacked up for saving storage space.

Another advantage of the invention is to provide a foldable liquid container with supporting frame, wherein the folded liquid container is easily and quickly unfolded with a single action without any tool or machine to save time and steps before using.

Another advantage of the invention is to provide a foldable liquid container with supporting frame, wherein the liquid container body is capable of draining the water or cleaning liquid out of the foldable liquid container body completely and leaving no residual while folding up, wherein the folded liquid container is also adapted for flushing clean conveniently.

Another advantage of the invention is to provide a foldable liquid container with supporting frame, wherein the foldable liquid container is easily to wash by flushing after use and is easily dried which is good for long-term storage.

Another advantage of the invention is to provide a foldable liquid container with supporting frame, wherein when the liquid container body is leaking, it is obvious to find where to be patching for continuously using.

Another advantage of the invention is to provide a foldable liquid container with supporting frame, wherein the foldable supporting frame is adaptable for replacing another foldable liquid container body to be supported for sustainably using.

Another advantage of the invention is to provide a foldable liquid container with supporting frame, wherein the foldable liquid container body is supported at a predetermined height from the ground by the foldable supporting frame for sanitary cleanness while using the water or cleaning liquid contained in the liquid container.

Another advantage of the invention is to provide a set of foldable liquid container and supporting frame, wherein the liquid container is supported at a predetermined height by the supporting frame for the user to operate the liquid container comfortably without bending and kneeling.

Additional advantages and features of the invention will become apparent from the description which follows, and may be realized by means of the instrumentalities and combinations particular point out in the appended claims.

According to the present invention, the foregoing and other objects and advantages are attained by a foldable liquid container set, which comprises:

a foldable supporting frame constructed to be folded and unfolded between a folded mode and an unfolded mode;

a foldable container body equipped with the foldable supporting frame, wherein the foldable container body is constructed to be folded and unfolded between a folded mode and unfolded mode and supported by the foldable supporting frame; and a switch device arranged on the foldable supporting frame to be operated to transform the foldable supporting frame between the folding mode and the unfolded mode by a single pulling operation of the switch, wherein the foldable supporting frame is supported in the unfolded mode while holding by the switch, wherein the switch is able to be operated to release support to the foldable supporting frame while transformed to the folded mode.

The switch device is operated by pulling a handle disposed on the foldable container body to fold the foldable supporting frame, wherein the foldable container body is equipped with the supporting frame that the foldable container body is folded and unfolded at the same time together with the folding and unfolding of the supporting frame respectively.

In one embodiment, the foldable supporting frame comprises at least two folding arms and at least four supporting legs supporting the folding arms, wherein the folding arms are pivotally connected to each other with the switch and the supporting legs are constructed to follow the folding arms to pivotally rotate.

In one embodiment, the folding arm further comprises a switching rod supported by the switch to limit the movement of the folding arm of the supporting frame in the unfolded mode.

In one embodiment, each of the supporting legs has a length correspondingly for raising the height of the container body.

In one embodiment, the foldable container body comprises a surrounding wall and a bottom base sealedly connected with the surrounding wall to form a bowl shape body, wherein the bottom wall has an outfall to discharge liquid inside the foldable container body.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 10B, a foldable liquid container according to a preferred embodiment is illustrated. The foldable liquid container is adapted for containing water or cleaning liquid therein to function as a bathtub, a swimming pool or the like. The foldable liquid container comprises a foldable supporting frame 10, a switch device 20 adapted to be operated to transform the foldable supporting frame 10 between an unfolded mode and a folded mode by a single pulling operation, and a foldable container body 30 arranged on and equipped with the foldable supporting frame 10. In other words, the foldable container body 30 is able to be unfolded for containing liquid therein for using when the foldable supporting frame 10 is unfolded. And, when the foldable supporting frame 10 is folded to the folded mode, the foldable container body 30 is folded with the supporting frame 10 together at the same time, such that the whole foldable liquid container is capable of being folded up for ease of storage and carrying.

Figure 1:
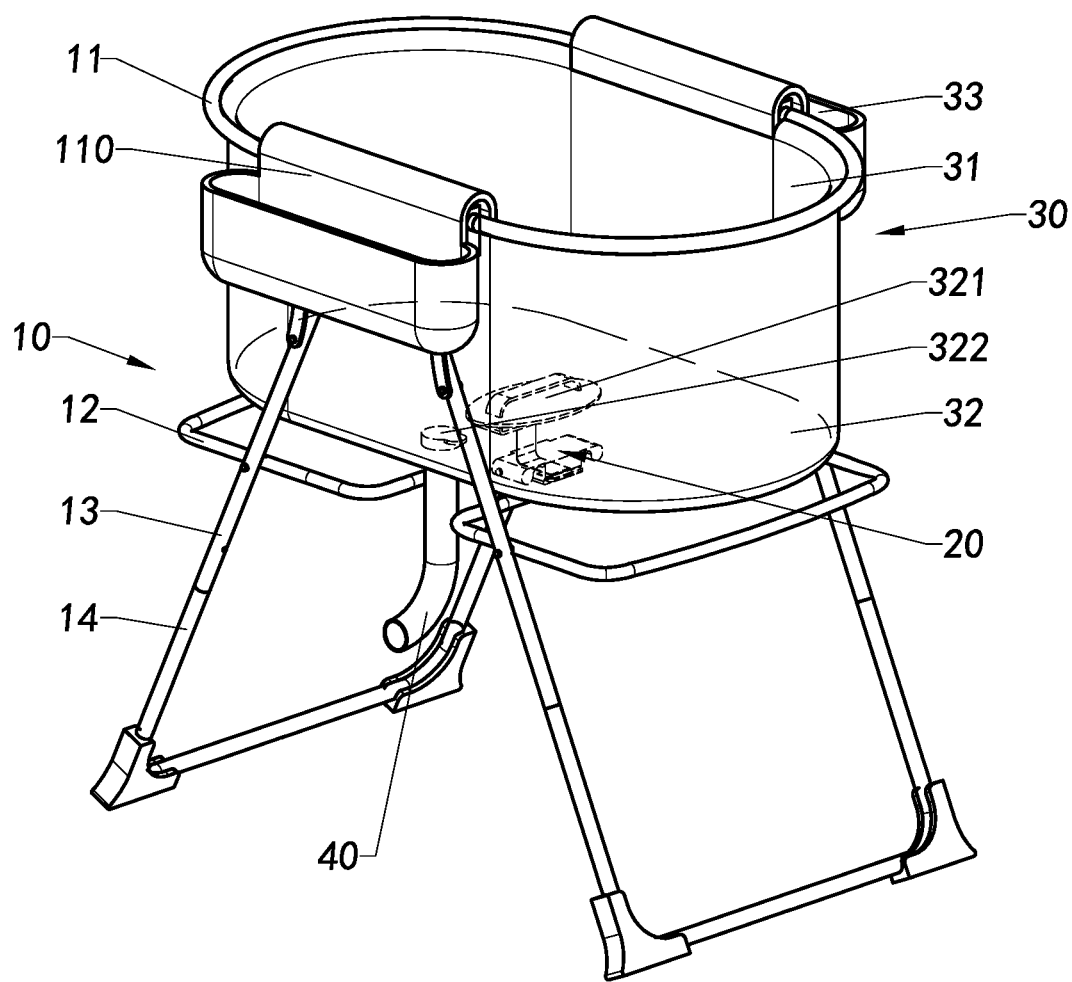
FIG. 1 is a perspective view of a foldable liquid container in an unfolded mode according to a preferred embodiment of the present invention.
Figure 2:
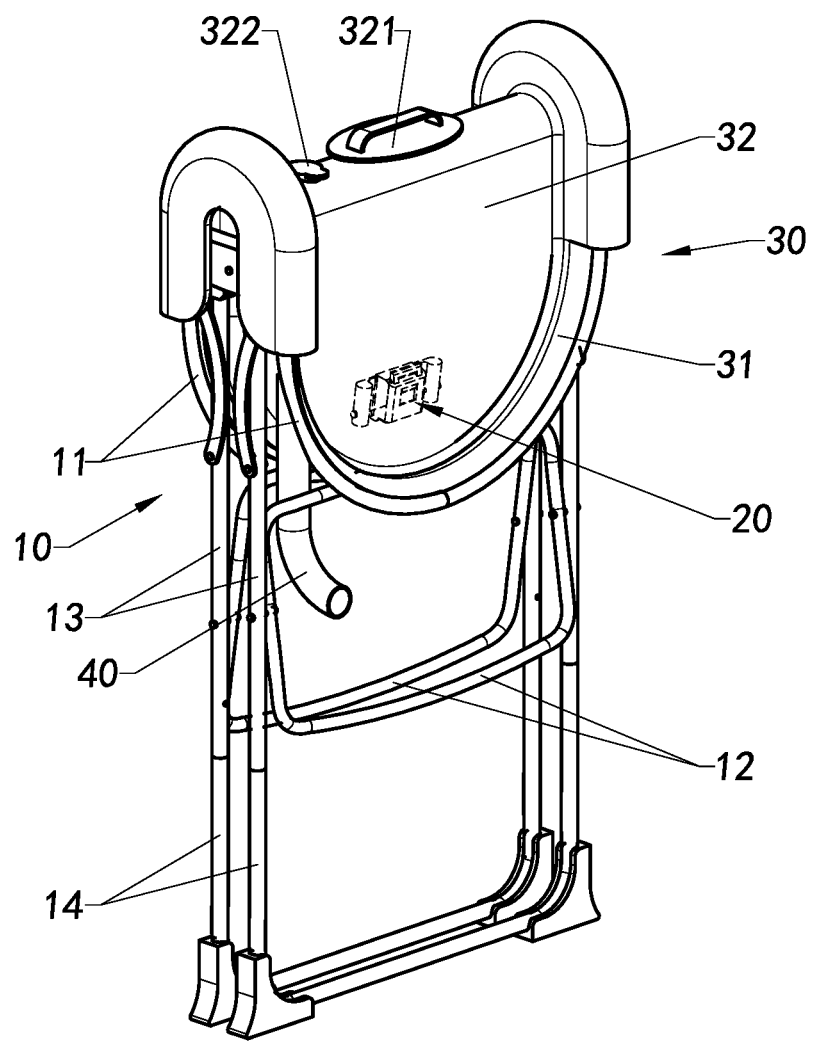
FIG. 2 is a perspective view of the foldable liquid container in a folded mode according to the above preferred embodiment of the present invention.

As shown in FIG. 1 and FIG. 2, the foldable container body 30 is fixedly arranged on the foldable supporting frame 10 according to the preferred embodiment. The foldable container body 30 is equipped to be driven to be folded or unfolded by the foldable supporting frame 10. The foldable container body 30 is adapted to be unfolded and prepared to be used when the foldable supporting frame 10 is unfolded. It is worth mentioning that simply a single pulling operation applied to the foldable supporting frame 10 can unfold the foldable liquid container. No extra step is required to open up the container body 30 independently or to enhance the stability of supporting the foldable container body 30. When the foldable supporting frame 10 is operated to be unfolded, the foldable container body 30 is unfolded at the same time. Similarly, the foldable container body 30 can be folded up simply by folding the foldable supporting frame 10, wherein the folding of the foldable supporting frame 10 will drive the container body 30 to be folded up together at the same time. Therefore, it is so easy to operate of transformation of the foldable liquid container between the folded mode and the unfolded mode.

Figure 3:
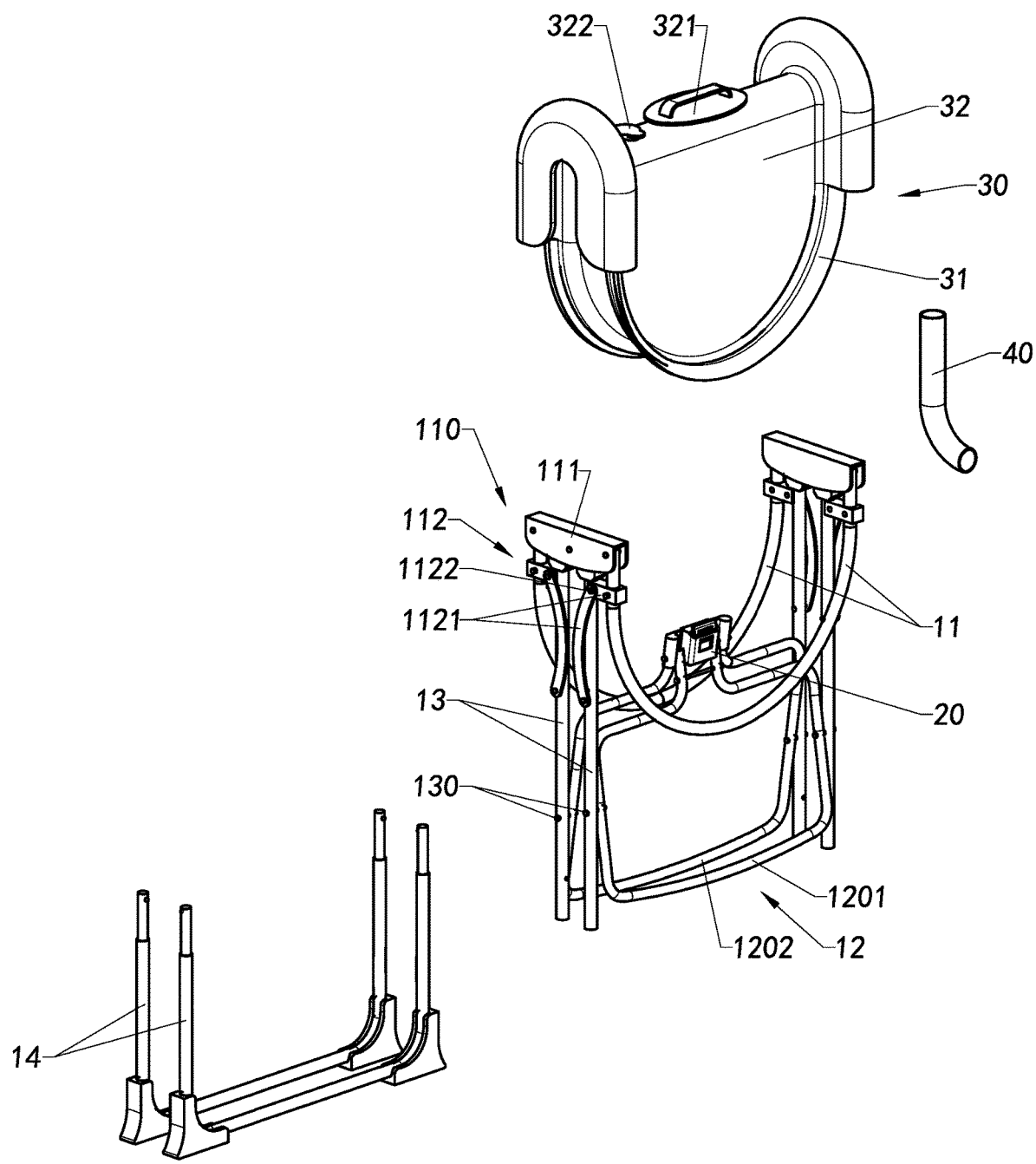
FIG. 3 is an exploded view of the foldable liquid container in the folded mode according to the above preferred embodiment of the present invention.

As shown in FIG. 3, the foldable supporting frame 10 comprises at least two U-shaped container arms 11, at least two C-shaped folding arms 12 and at least two pairs of supporting legs 13, wherein the container arms 11 are cooperatingly linked with the folding arms 12 through the supporting legs 13 which support both the folding arms 12 and the container arms 11. Preferably, the number of the container arms 11, the folding arms 12 and the supporting legs 13 are correspondingly designed, wherein each of the container arms 11 and each of the folding arms 12 are correspondingly supported by the supporting legs 13.

It is worth to mention that the folding arms 12 are pivotally connected to each other by the switch device 20. And, the folding arms 12 is capable of driving the container arms 11 and the supporting legs 13 to fold or unfold following the movement of the folding arms 12. The two folding arms 12 are capable of overlapping with each other to fold up with the foldable supporting frame 10 in the folded mode, as shown in FIG. 2, and extending horizontally to 180 degrees with each other to unfold with the foldable supporting frame 10 in the unfolded mode, as shown in FIG. 1. Therefore, as the folding arms 12 is folded up, the container arms 11 and the supporting legs 13 are driven to follow the folding arms to be folded up as shown in FIG. 2. Accordingly, it is so convenient that simply by folding up the folding arms 12, the whole foldable supporting frame 10 is folded. And, when the foldable supporting frame 10 is folded, the foldable container body 30 is driven to fold up as well.

Referring to in FIG. 3, the switch device 20 is connected between the two folding arms 12 in an end to end manner with each other for transforming the folding arms 12 to be folded and unfolded. The switch device 20 is constructed to be operated by pulling to transform the folding arms 12 from the unfolded mode into the folded mode. In other words, when the foldable supporting frame 10 is in the unfolded mode, the switch device 20 can be pulled to change the situation of the folding arms 12, and that the supporting force of the folding arms 12 is released and the folding arms 12 can be unfolded and folded by means of gravity. Therefore, the foldable supporting frame 10 can be folded simply by pulling the switch device 20 such that the foldable supporting frame 10 can be folded up simply by a single pulling operation.

Figure 4:
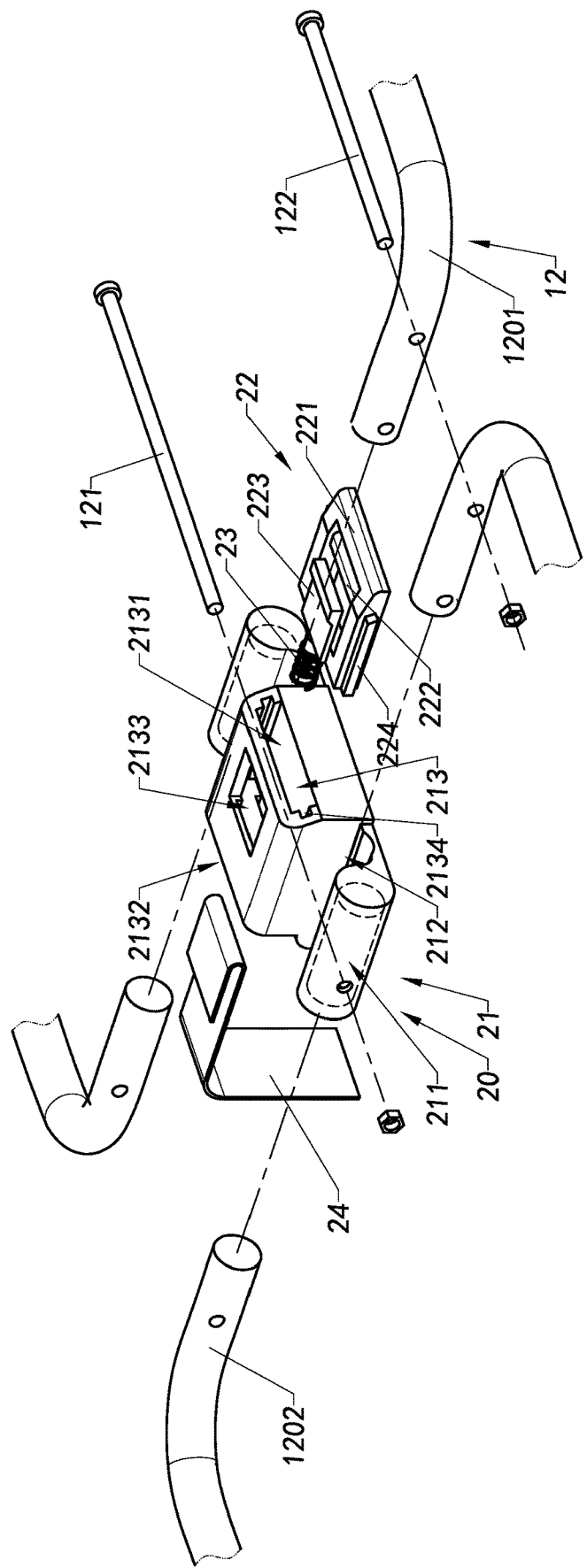
FIG. 4 is an enlarged exploded view of the switch device of the foldable liquid container according to the above preferred embodiment of the present invention.

Specifically, the folding arms 12 are pivotally connected with each other at the ends thereof around a pivot rod 121. The pivot rod 121 is mounted on the switch device 20. The two folding arms 12 are pivotally mounted to the switch device 20 while the switch device 20 limits the rotation of the folding arms 12 about the pivot rod 121 against each other. According to the preferred embodiment, one of the folding arms 12 is fixed to the switch device 20 as a fixed arm 1202, and the other folding arm 12 is relatively pivoted against the switch device 20 defined as a free arm 1201, as shown in FIGS. 3 and 4. The fixed arm 1202 is mounted on the switch device 20 by the pivot rod 121 while the free arm 1201 is movably connected to the switch device 20 for pivotally rotating about the pivot rod 121.

It is worth mentioning that two end portions of the free arm 1201 further transversely connected with a switching rod 122. When the two folding arms 12 are unfolded in 180 degrees with each other in a horizontal manner, the switching rod 122 is supported by the switch device 20 securely with the free arm 1201 horizontal to the fixed arm 1202, that is the free arm 1201 and the fixed arm 1202 are on the same plane horizontally. When the switching rod 122 is securely engaged by the switch device 20, the free arm 1201 is supporting against the fixed arm. When the switch device 20 retains to engage with the switching rod 122, the free arm 1201 is unfolded and retained in parallel with the fixed arm 1202. When the engagement of the switching rod 122 and switch device 20 is released, the free arm 1201 is able to be rotated about the pivot rod 121 due to gravity towards the fixed end so as to fold up the two folding arms 12. In other words, as the switching rod 122 is supported and engaged by the switch device 20, the folded arms 12 are unfolded and securely locked up its unfolded position due to the engagement and limitation of the switch device 20. Once the switching rod 122 is detached and released from the switch device 20, the folded arms 12 are capable of rotating about the pivot rod 121 until overlappingly folded up. Thus, the switch device 20 does control the movement of the folded arms 12, as well as the folding or unfolding of the foldable supporting frame 10 is operated substantially by the switch device 20.

Furthermore, the two pairs of the supporting legs 13 are pivotally connected with the two folding arms 12 respectively through four pivotal shafts 130. As the folding arms 12 are capable of pivotally rotating about the pivot rod 121 that the angle and distance between the folding arms 12 may change and the supporting legs 13 are driven to rotate about the pivotal shaft 130 while folding and unfolding of the foldable supporting frame 10. Each of the supporting legs 13, each of the folding arms 12 and the pivotal shaft 130 pivotally connecting the folding arm 12 with the corresponding supporting leg 13 form a X-shape frame structure. Since the movement of the folding arms 12 is transmitted to the supporting legs 13, it is unnecessary to move the supporting legs 13 to fold or unfold the supporting frame 10.

Figure 5:
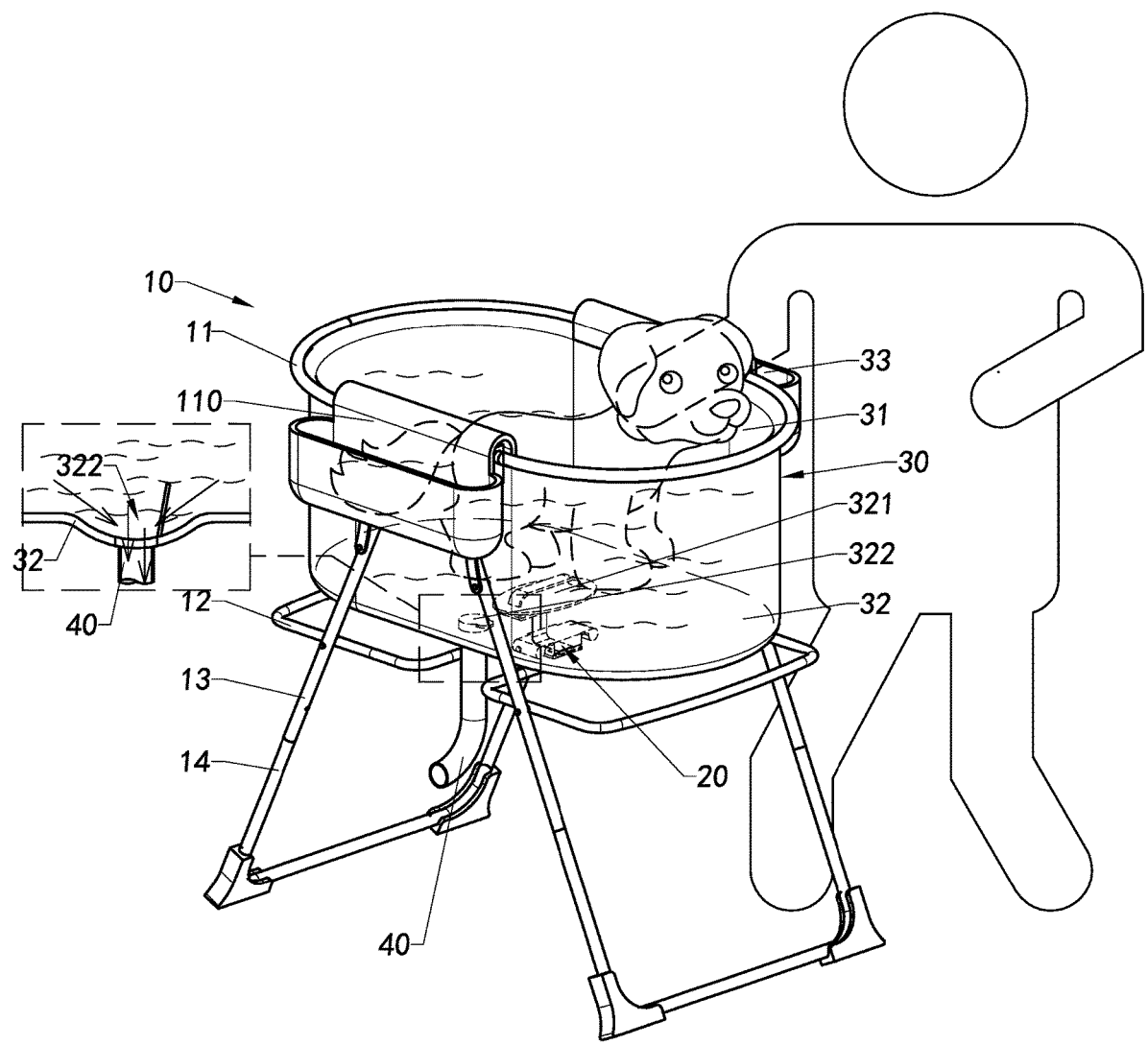
FIG. 5 is a perspective view of the foldable liquid container in application according to the above preferred embodiment of the present invention.

In addition, the foldable supporting frame 10 further comprises a pair of folding units 110, wherein two top ends of one pair of the four supporting legs 13 are pivotally connected to one of the folding units 110 respectively, as shown in FIG. 3, while two ends of each of the U-shape container arms 11 are pivotally connected to the two folding units 110 respectively and four end portions of the two container arms 11 are respectively linked with the four supporting legs 13 in such a manner that the two container arms 11 are driven by the two pairs of the supporting legs 13 to rotate about the two folding units 110 to be selectively folded up to the folded mode as shown in FIGS. 2 and 3 or unfolded to the unfolded mode, having 180 degrees between the two container arms 11, as shown in FIG. 1, to form a ring shaped container rim with the folding units 110. As the two pairs of the supporting legs 13 are driven to rotate about the two folding units 110 to fold or unfold with the folding or unfolding movement of the two folding arms 12, the two container arms 11 linked to the two pairs of the supporting legs 13 are driven by the two pairs of the supporting legs 13 to pivotally rotate about the two folding units 110 respectively to fold or unfold at the same time too. Each pair of the supporting legs 13, having top ends thereof pivotally connected with the respective folding unit 110 and mid portions thereof pivotally connected with the folding arms 12, form a A-shaped foldable frame as shown in FIGS. 1 and 5. The folding or unfolding of the folding arms 12 will automatically driven the foldable supporting frame 10 to be folded or unfolded without the need to operate the supporting legs 13 since the movement of the two folding arms 12 will drive the two pairs of the supporting legs 13 to rotate about the two folding units 110 respectively to open up to form a pair of A-shaped foldable frames or to close up to be parallel with each other as shown in FIGS. 2 and 3.

In particular, as shown in FIG. 3, each of the folding units 110 comprises a folding base 111 and a linkage configuration 112. Each of the folding bases 111 has a U-shaped cross section such that two ends of each of the container arms 11 are pivotally connected to first sides of the two folding bases 111 respectively while two ends of the other container arms 11 are pivotally connected to second sides of the two folding bases 111 respectively, wherein the four top ends of the two pairs of the supporting legs 13 are pivotally connected to middle portions of the two folding bases 111 enabling the first pair of the supporting legs 13 being rotatable about one of the folding bases 111 to form the first A-shaped foldable frame while the second pair of the supporting legs 13 being rotatable about the other folding base 111 to form the second A-shaped foldable frame, as shown in FIGS. 1 and 5. The linkage configuration 112 comprises two pairs of arm holders 1121 respectively mounted between the four mid portions of the two pairs of the supporting legs 13 and the four end portions of the two container arms 11 respectively, as shown in FIG. 3, wherein one end of each arm holder 1121 is pivotally mounted to the mid portion of the respective supporting leg 13 and another end of each arm holder 1121 is pivotally mounted to one end portion of the respective container arm 11, such that a maximum angle is formed between the container arm 11 and the corresponding supporting leg 13 when the foldable supporting frame 10 is in the unfolded mode, as shown in FIG. 1, that the container arms 11, the pair of supporting legs 13 and the pair of arm holders 1121 form an A-shape structure, and that a minimum angle is formed between the container arm 11 and the corresponding supporting leg 13 when the foldable supporting frame 10 is in the folded mode, as shown in FIGS. 2 and 3, that the the supporting legs 13 and the container arms 11 are folded to collapse in parallel manner, wherein the container arms 11 and the supporting legs 13 are linked by the arm holders 1121 to move together about the folding bases 111.

Preferably, the folding arms 12 is able to be folded by operating the switch device 20 by releasing the switching rod 122 from the engagement with the switch device 20 in order to fold up the supporting legs 13 and the container arms 11. Preferably, the container arms 11 is able to be unfolded by driving the folding arms 12 to be supported by the switch device 20 and driving the supporting legs 13 to be unfolded too.

According to the preferred embodiment of the present invention, referring to FIGS. 1-3, in order to further raise the height of the container arms 11 and keep the container body 30 mounted on the container arms 11 at a more comfortable operation position as shown in FIG. 5, the supporting frame 10 further comprises a pair of U-shaped lengthening legs 14, wherein four upper ends of the two lengthening legs 14 are connected with four bottom ends of the four supporting legs 13 respectively. With the leveling of the pair of lengthening legs 14, the foldable container body 30 is supported at a predetermined height staying away from the ground for relative sanitary cleanness while using water or cleaning liquid contained in the foldable container body 30. The user can comfortable use the foldable liquid container without bending or kneeling.

The foldable container body 30 comprises a surrounding wall 31 and a bottom base 32 sealedly connected with the surrounding wall 31 to construct a bowl shape body. A peripheral edge of the surrounding wall 31 is mounted on the container arms 11 of the foldable supporting frame 10 so as to support the foldable container body 30 on the foldable supporting frame 10. In an alternative mode of the invention, the foldable container body 30 is detachable arranged on the container arms 11 for ease of replacement. The foldable container body 30 further comprises at least one pocket 33 extended outwardly and downwardly from the periphery edge of the surrounding wall 31. The pocket 33 is adapted to hold other cleaning tools therein for conveniently grabbing and using during the cleaning and playing in the liquid contained in the container body 30.

It is worth mentioning that the bottom wall 32 has an outlet 322 formed for discharging liquid inside the container body 30. Preferably, the outlet 322 is provided at an area comparatively low than other area for efficiently draining. The outlet 322 is adapted to connect a drain-pipe 40 to direct the liquid to flow out of the container body 30 along a certain path. A plug is adapted to cover the outlet 322 while containing liquid in the container body 30 and is detachable to open the outlet 322 for discharging the liquid in the container body 30.

The foldable container body 30 further comprises a handle 321 at the bottom base 32 to connect with the switch device 20 for operation of folding up the folding arms 12 by pulling the handle 321 upwards.

As shown in FIG. 4, the switch device 20 comprises a main body 21, a slider 22 slidably mounted in the main body 21 and a resilient member 23 connected between the main body 21 and the slider 22 so as to fasten the slider 22 inside the main body 21 in a slidable manner. The main body 21 is structured and shaped to hold the ends of the folding arms 12. In particular, the main body 21 pivotally holds the free arm 1201 and fastens the fixed arm 1202 such that the free arms 1201 is capable of rotating about the main body 21, that is to fold up to parallel with the fixed arm 1202 or to unfold to 180 degrees with the fixed arm 1202. It is worth mentioning that the resilient member 23 provides a resilient force normally pushing against the slider 22 to retain an end portion of the slider 22 protruded out of the main body 21, wherein the end portion of the slider 22 protruded out of the main body 21 is capable of supporting the folding arms 12 in position during the unfolded mode. When the slider 22 is pushed into the main body 21 to compress the resilient element 23 until the end portion of the slider 22 moves inside the main body 21, the supporting of the folding arms 12 is released and thus the folding arms 12 is moveable and able to be rotated around the switch device 20 (rotating about the pivot rod 121 according to the preferred embodiment) to the folded mode. When the folding arms 12 are no longer be supported by the slider 22 of the switch device 20, the folding arms 12 are able to be folded to overlap with each other.

In other words, when the free arm 1201 is rotated to be supported by the slider 22 to be the same plane with the fixed arm 1202, the folding arms 12 are unfolded to have generally 180 degrees therebetween and the foldable supporting frame 10 is in the unfolded mode. When the slider 22 is pressed to move inside the main body 21, the supporting of the free arm 1201 by the slider is released and the free arm 1201 is able to be folded to parallel with the fixed arm 1202 and the foldable supporting frame 10 is in the folded mode.

Figure 6A:
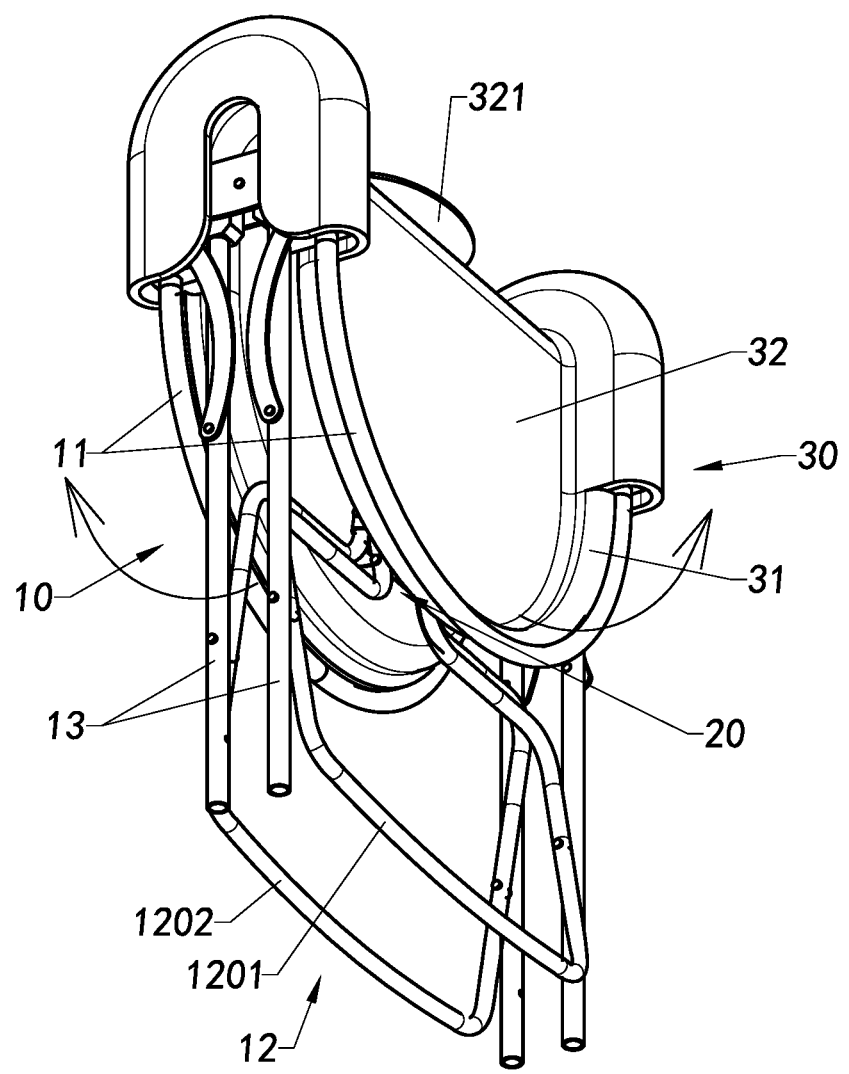
FIG. 6A to FIG. 6C are perspective views illustrating the unfolding operation of the foldable liquid container according to the above preferred embodiment of the present invention.

According to the preferred embodiment, the main body 21 has tubular two fixed arm chambers 211 provided at two sides thereof, two C-shaped free arm chambers 212 provided adjacent and parallel to the two fixed arm chambers 211 respectively and a slot-like slider chamber 213 formed between the two free arm chambers 212. The end portions of fixed arm 1202 are inserted in the fixed arm chambers 211 and fastened by the pivot rod 121 which is traversely extended through the main body 21, wherein the end portions of the free arm 1201 are extended in the free arm chambers 212 respectively and are pivotally connected by the pivot rod 121 so that the free arms 1201 are able to be rotated to fold and unfold about the pivot rod 121 with respect to the stationary fixed arms 1202. In other words, the end portions of the free arm 1201 and the end portions of fixed arm 1202 are both held in position by the pivot rod 121 with the main body 21 of the switch device 20. The fixed arm 1202 is held in stationary manner in the fixed arm chambers 211 of the main body 21 and the free arm 1201 is mounted in a pivotally movable manner in the free arm chambers 212 of the main body 21 for rotating about the pivot rod 121 in one direction to fold up to parallel with the fixed arm 1202, as shown in FIGS. 3 and 6A, while the main body 21 also preventing the free arm 1201 to rotate about the pivot rod 121 in the other direction during the unfolded mode, as shown in FIGS. 1 and 6C. The slider 22 is slidably disposed inside the slider chamber 213 to be moved in or out of the slider chamber 213 under the resilient force of the resilient member 23.

Figure 6B:
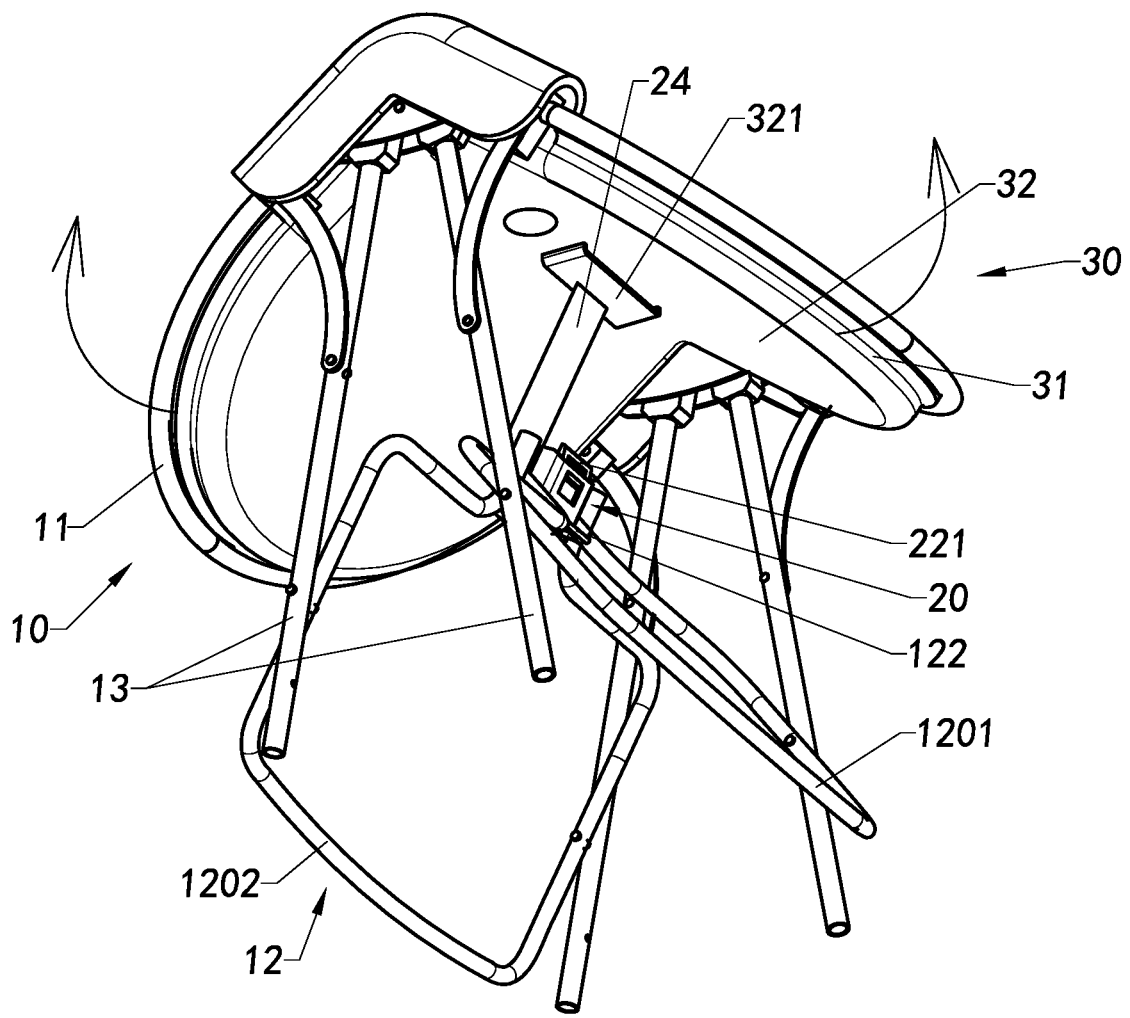
Figure 6C:
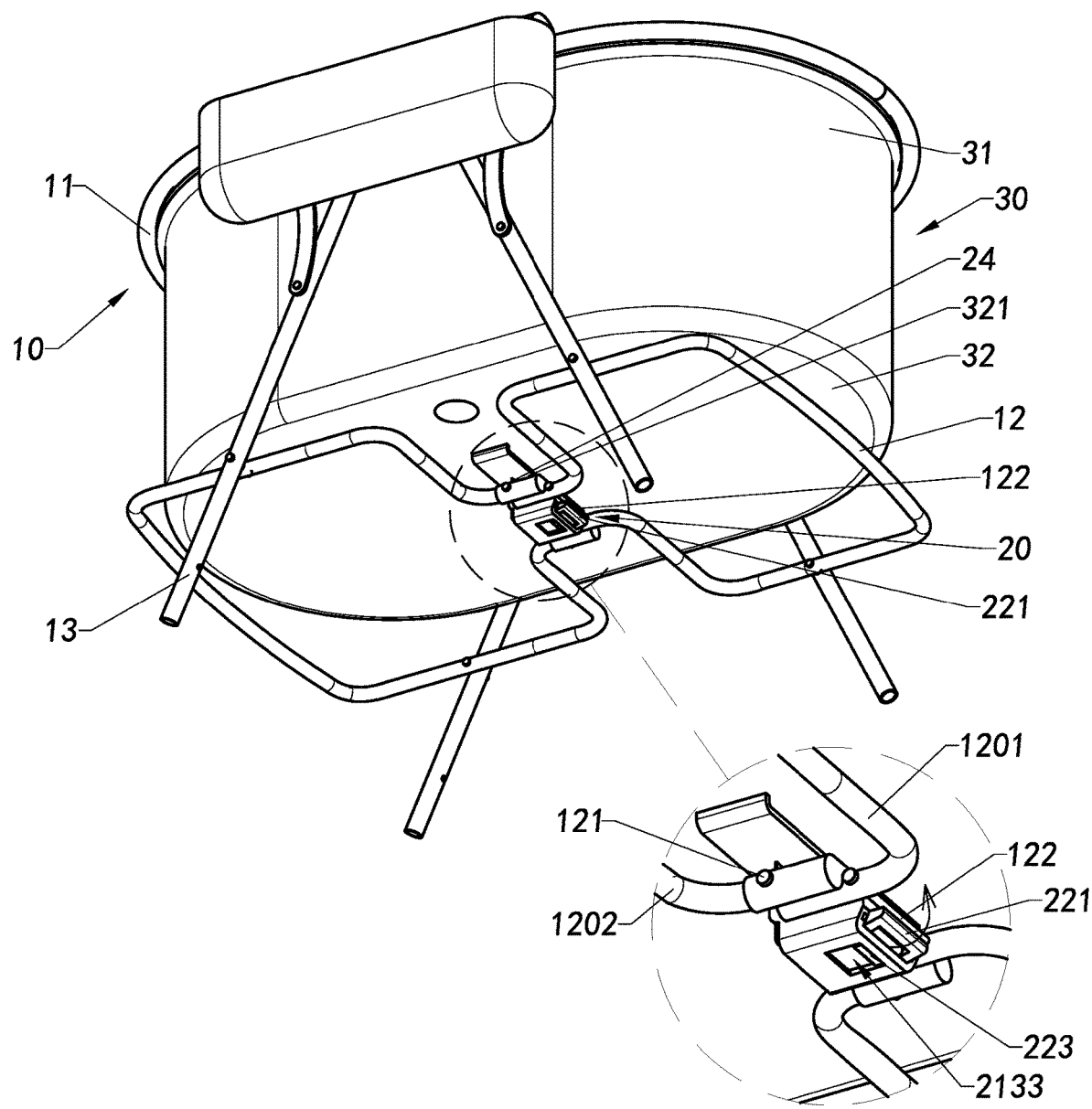

The switching rod 122 arranged outside the main body 21 is capable of applying a pressing force to the slider 22 to push the slider 22 to move back in the slider chamber 213, as shown in FIGS. 6A to 6C. When the free arm 1201 is rotated about the pivot rod 121 to unfolded, as shown in FIGS. 6A and 6B, the switching rod 122 is lifted up to apply a force to the slider 22 and press the slider 22 to move back into the slider chamber 213. When the switching rod 122 is engaged with the slider 22 without forcing, as shown in FIG. 6C, the slider 22 is remained being pushed out of the slider chamber 213 by the resilient member 213 and the end portion of the slider 22 is protruded out of the main body 21 again, wherein the switching rod 122 is supported by and engaged with the protruded end portion of the slider 22 while the foldable supporting frame 10 is in the unfolded mode and thus the switching rod 122 is not able to push the slider 22 to move into the slider chamber 213 but to apply its weight on the slider 22 to reinforce the engagement of the switching rod 122 and the end portion of the slider 22. As long as the end portion of the slider 22 is retained being protruded out of the main body 21, the switching rod 122 is remained being supported by the slider 22 of the switch device 20, so that the free arm 1201 and the fixed arm 1202 of the folding arms 12 are unfolded to be extended horizontally on the same plane in a flat and stable manner, as shown in FIGS. 1, 5 and 6C.

The end portion of the slider 22 is a supporting end portion 221 having an inclined shape adapted for the switching rod 122 to push the supporting end portion 221 to move towards the slider chamber 213. The supporting end portion 221 supports the switching rod 122 on the slider 22 and bears the weight of the switching rod 122 without being pushed back.

The slider 22 further comprises a pulling portion 222 which is adapted to be securely connected to an elongated pulling member 24. By pulling the pulling member 24, the slider 22 is pressed to moved into the slider chamber 213 and compress the resilient member 23.

The slider 22 further comprises a stopper 223 upwardly protruded with respect to a position of a stopper window 2133 formed in the main body 21 to communicate the slider chamber 213 with outside, wherein the stopper 223 is arranged to be positioned in the stopper window 2133 while the slider 22 is inserted in the slider chamber 213 of the main body 21 so as to install the slider 22 in the slider chamber 213 and prevent the slider 22 from being pushed out of the slider chamber 213 by the resilient member 23. In other words, the slider 22 is limited by the stopper window 2133 and guided to move in and out of the slider chamber 213 by the stopper 223 which is limited to be sliding within the stopper window 2133 and the resilient member 23 is retained inside the slider chamber 213 by means of the stopper 223 for applying an out pushing force against the slider 22 to retain the supporting end portion 221 being protruded out of the main body 21. Also, the in and out movement of the slider 22 within the slider chamber 213 is limited by the stopper window 2133 to move along a predetermined path and distance along the slider chamber 213. According to the preferred embodiment, the slider chamber 213 further has at least one sliding slot 2134 formed on at least one side of the slider chamber 213 and the slider 22 further comprises at least one sliding rail 224 protruded on at least one side thereof which is adapted to be slidable inserted and engaged in the respective sliding slot 2134 when the slider 22 is installed in the slider chamber 213 so as to limit and guide the direction and distance of sliding movement of the slider 22.

The two ends of the slider chamber 213 of the main body 21 form a supporting end opening 2131 facing the free arm 1201 and a pulling opening 2132 facing the fixed arm 1202. The end portion of the slider 22 is extended to protrude out from the supporting opening 2131 with the pushing force of the resilient member 23, wherein the end portion of the slider 22 is able to be forced by the switching rod 122 to pull back into the slider chamber 213 towards the pulling opening 2132. Since the slider chamber 213 has the stopper window 2133 provided on top of the main body 21 to receive the stopper 223 of the slider 22, the stopper window 2133 is capable of guiding and limiting the stopper 223 to be moving within and along the stopper window 2133. In other alternative mode of the embodiment, the stopper window 2133 is able to be shaped in form of a slot to limit the movement of the stopper 223.

The pulling member 24 is extended from the pulling portion 222 of the slider 22 through the pulling opening 2132 to the outside of the main body 21. When the pulling member 24 pulls the slider 22 back into the slider chamber 213, the supporting end portion 221 is moved back while the stopper 223 is limited by the stopper window 2133 to avoid over movement.

According to the preferred embodiment, one end of the pulling member 24 is connected to the handle 321 of the bottom base 32 of the container body 30 while the other end of the pulling member 24 is connected to the pulling portion 222 of the slider 22. Therefore, as the handle 321 is pulled to lift the container body 30, the pulling member 24 transmits the force to pull the slider 22 to move inside the slider chamber 213. In other words, only a single pulling operation step of pulling the handle 321 of the container body 30 is required, the switch device 20 is operated to fold up the supporting frame 10.

In particular, the relationship and movement of unfolding the foldable liquid container according to the preferred embodiment are illustrated in FIG. 6A to FIG. 6C.

To unfold the foldable liquid container, the container arms 11 is opened flatly to be on the same plane as shown in FIG. 6C from the folded mode as shown in FIG. 6A when the foldable liquid container is required to be used. The container arms 11 will lead the supporting legs 13 to move to be unfolded around the folding unit 110. The supporting legs 13 drive the folding arms 12 to be opened up around the pivotal shaft 130. In other words, the folding arms 12 are forced to rotate about the pivotal shaft 130 with the movement of the supporting legs 13. When the folding arms 12 are unfolded to be horizontally extended on the same plane and having generally 180 degrees with each other, the folding arms 12 are rotated about the pivot rod 121. The folding arms 12 are supported by the switch device 20 to limit further movement.

In particular, as the free arm 1201 is rotating away from the fixed arm 1202, the free arm 1201 is rotated to be supported by the slider 22 of the switch device 20 and be the same plane with the fixed arm 1202, the folding arms 12 is unfolded flatly to have generally 180 degrees with each other, such that the foldable supporting frame 10 is in the unfolded mode. As the free arm 1201 is rotating, the switching rod 122 is lifted to apply force on the supporting end portion 221 of the slider 22. Then, the slider 22 is pushed to move back into the slider chamber 213, and the switching rod 122 is continually lifted over the slider 22. The slider 22 is pushed out the slider chamber 213 by the resilient member 23 until the supporting end portion 222 of the slider 22 is protruded out of the slider chamber 213 again. Then, the switching rod 122 is supported by and engaged with the protruded supporting end portion 222 of the slider 22, wherein, in this situation, the switching rod 122 is not able to push the slider 22 back but to apply its weight on the slider 22, so that the folding arms 12 are unfolded with stably supported by the switch device 20 and the foldable supporting frame 10 is in the unfolded mode as well. The container body 30 is opened up by the unfolded container arms 11.

Accordingly, with the unfolding of the container arms 11 of the foldable supporting frame 10, the folding arms 12 are supported by the switch device 20 stably and the container body 30 is opened following the movement of the container arms 11.

Figure 7A:
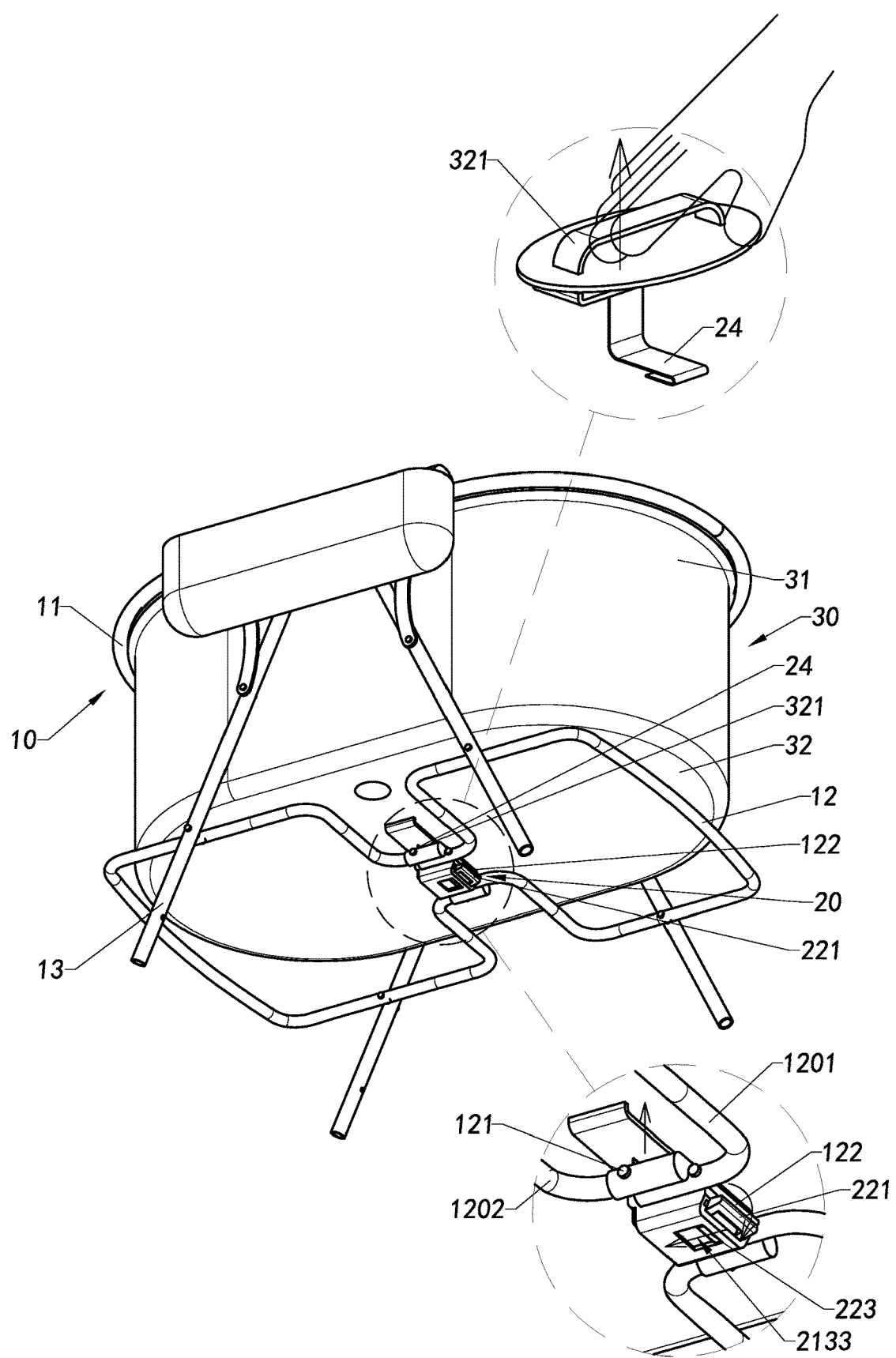
FIG. 7A to FIG. 7C are perspective views illustrating the folding operation of the foldable liquid container according to the above preferred embodiment of the present invention.
Figure 7B:
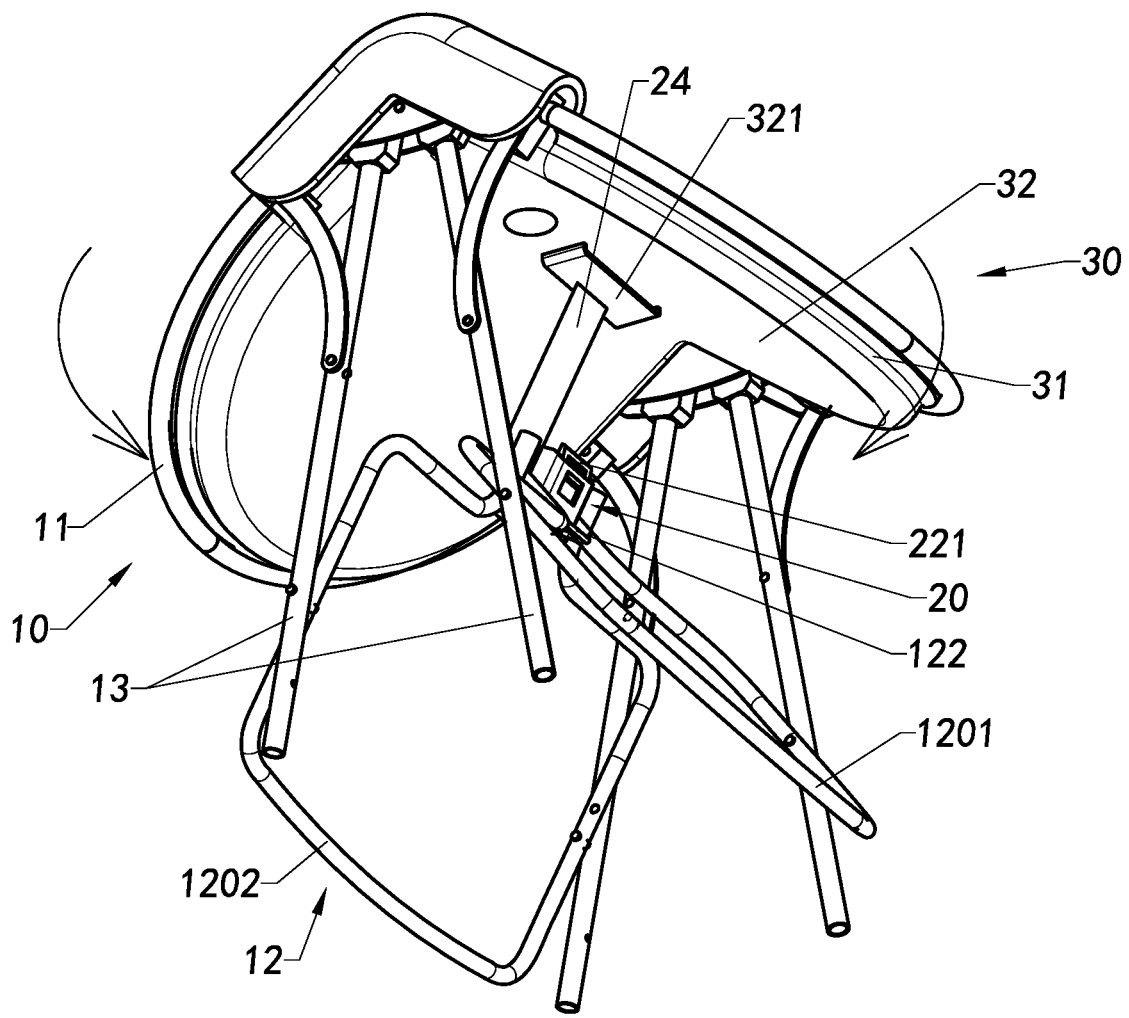
Figure 7C:
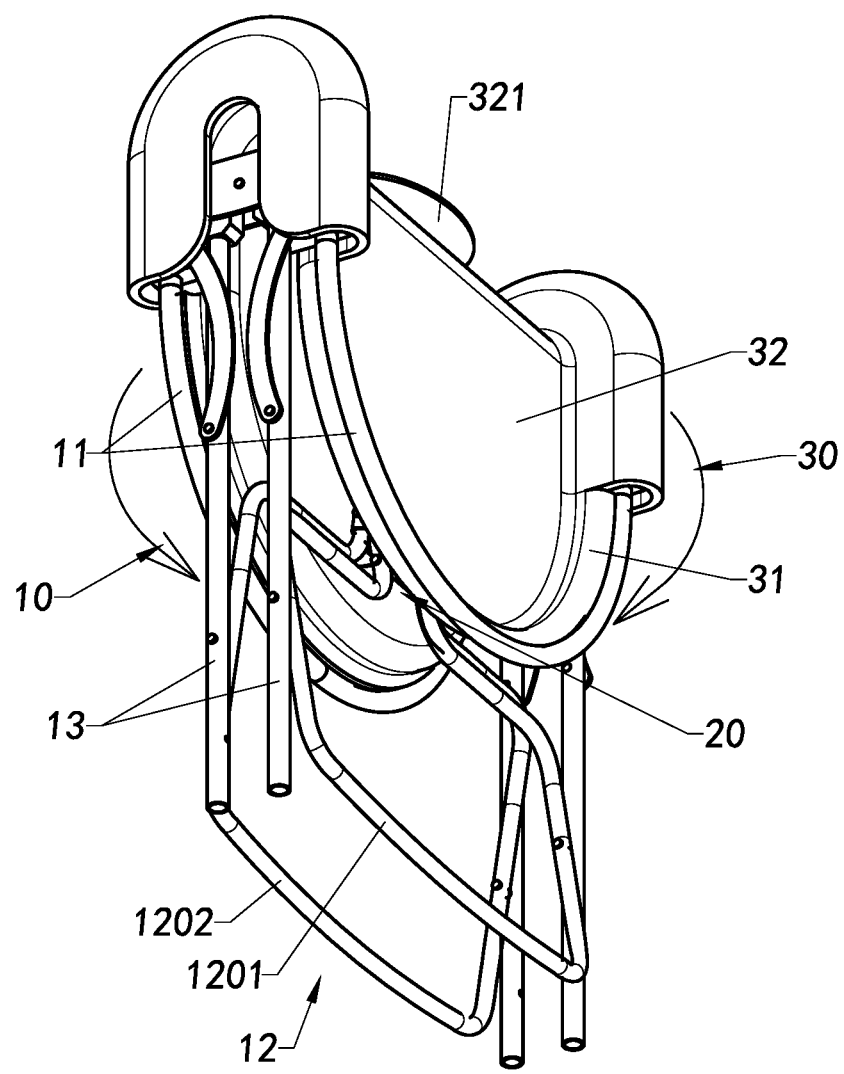
Figure 8:
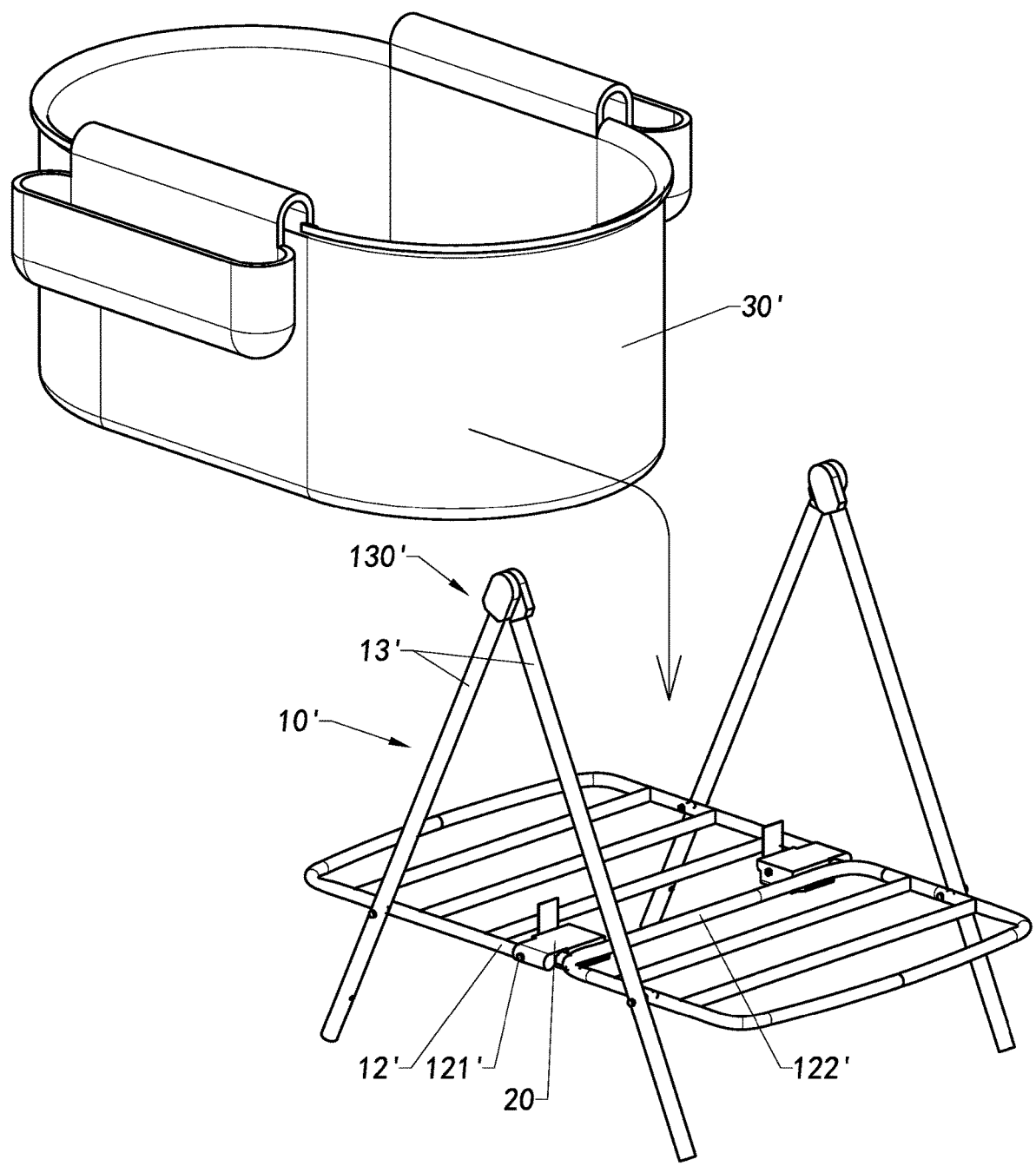
FIG. 8 is a perspective view of the foldable liquid container according to an alternative mode of the above preferred embodiment of the present invention.

In addition, the relationship and movement of folding of the foldable liquid container according to the preferred embodiment are illustrated in FIG. 7A to FIG. 7C.

To fold up the foldable liquid container, the handle 321 may simply be pulled to lift the container body 30, and then the pulling member 24 transmits the force to pull the slider 22 to move back inside the slider chamber 213. When unfolded the folding arms 12, the supporting end portion 221 is supporting the switching rod 122 on the plane to bear the weight of the switching rod 122 without being pushed back. When the slider 22 is driven to move back into the slider chamber 213 and compress the resilient member 23, the switching rod 122 of the folding arms 12 loses the support of the end portion of the slider 22 and the free arm 1201 is able to be rotated about the pivot rod 121 to overlap with the fixed arm 1202 and fold up the supporting frame 10.

When the folding arms 12 are folded up to be parallel with each other, the container arms 11 and the supporting legs 13 are driven to be folded up too, wherein the folding arms 12 are rotated to force the supporting legs 13 moving around the pivotal shaft 130. In other words, the supporting legs 13 which are linked with the folding arms 12 are rotated to fold up with the folding arms 12 and the container arms 11 are forced to rotate about the folding units 110 to be folded up too.

In view of above, simply by pulling the pulling member 24 to operate the switch device 20, the support of the folding arms 12 by the switch device 20 is released and the folding arms 12 will fall down and fold up due to gravity. Then, the supporting legs 13, the container arms 11 and the container body 30 are folded together following the folding up of the folding arms 12. Accordingly, the foldable liquid container can be folded by means of a single pulling operation.

Referring to FIG. 8 to FIG. 10B, an alternative mode of the preferred embodiment of the present invention. The different between the alternative mode and the above preferred embodiment is that the container body 30' is detachably arranged on the foldable supporting frame 10'. It is worth mentioning that the container body 30' can be any conventional container that is suitable to be carried by the foldable supporting frame 10'.

The foldable supporting frame 10' comprises at least two folding arms 12' and at least four supporting legs 13'. Preferably, the number of the folding arms 12' and the supporting legs 13' are correspondingly designed to well support the container body 30', wherein each of the folding arms 12' is correspondingly supported by a pair of the supporting legs 13'.

Figure 9A:
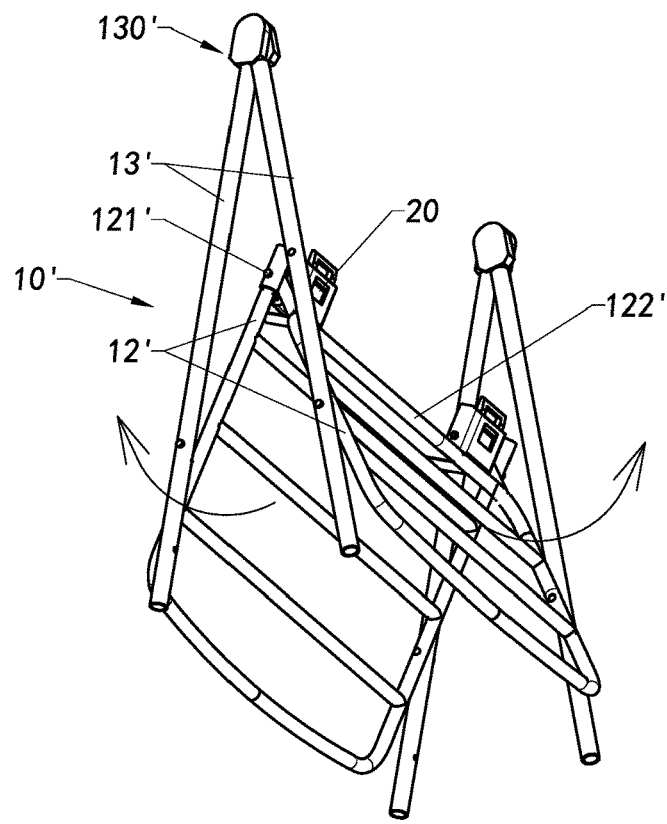
FIG. 9A to FIG. 9B are perspective views illustrating the unfolding operation of the foldable liquid container according to the alternative mode of the above preferred embodiment of the present invention.
Figure 9B:
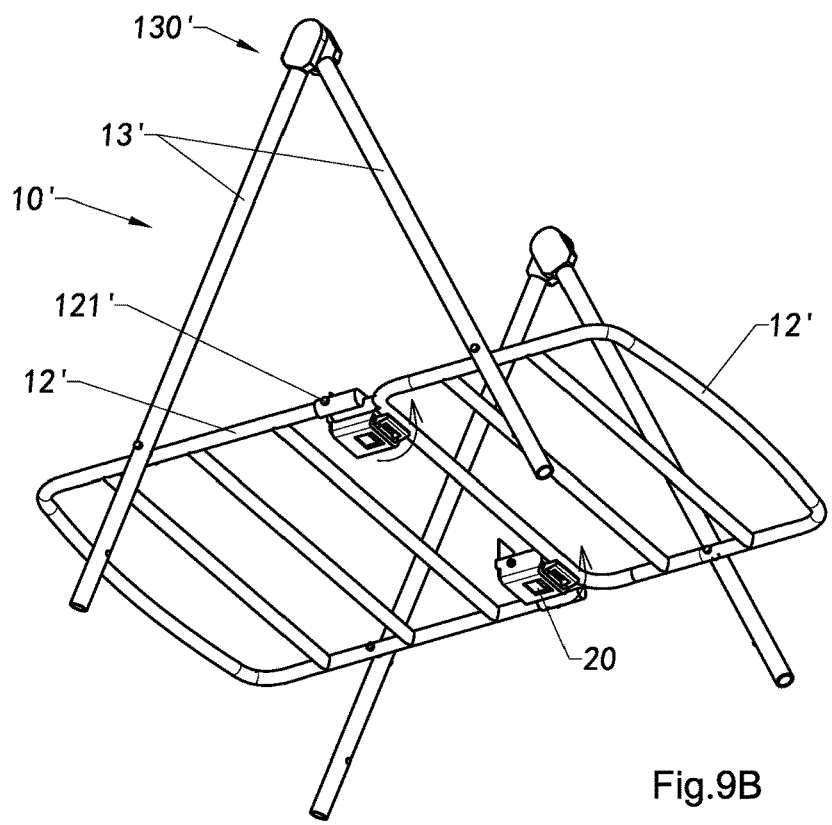

Furthermore, two of the supporting legs 13' are pivotally connected with each other by a pivotal shaft 130' according to the alternative mode of the preferred embodiment. And, the supporting legs 13' are linked with the folding arms 12' and forced to rotate about the pivotal shaft 130' with the folding arms 12'. As shown in FIG. 9A and FIG. 9B, as the folding arms 12' are rotating about the pivot rod 121' to be folded or unfolded, the angle and distance between the folding arms 12' will change accordingly and the supporting legs 13' are driven to rotate about the pivotal shaft 130' too.

According to the alternative mode of the preferred embodiment, there are two switch devices 20 mounted on the two folding arms 12' respectively. The switch devices 20 may have the same structure and function as the above preferred embodiment. But the switching rod 122' may be differently designed and shaped, wherein the switching rod 122' is integrally formed with the folding arms 12' while being supportive.

In addition, the relationship and movement of the unfolding of the foldable liquid container according to the alternative mode of the preferred embodiment are illustrated in FIG. 9A to FIG. 9B.

The foldable supporting frame 10' can be opened from the folded mode to the unfolded mode. The folding arms 12' drive the supporting legs 13' to rotate about the pivotal shaft 130' to unfold. Also, the supporting legs 13' are capable of driving the folding arms 12 to be opened up as required. When the folding arms 12' are unfolded to be on the same plane with each other, the folding arms 12' are rotated about the pivot rod 121' and the folding arms 12' are supported by the switch devices 20 to limit further downwards or upwards movement of the folding arms 12' by the supporting legs 13' and the pivotal shaft 130'.

In particular, as one of the folding arms 12' is rotating towards the other folding arm 12', the switching rod 122' is lifted and applies a force on the supporting end portions 221 of the sliders 22. Each of the sliders 22 is supported on the side portion of the switching rod 122' so that the switching rod 122' is symmetrically supported by the two switch devices 20. Then each of the sliders 22 is pushed to move back into the slider chamber 213, and the switching rod 122' is continually lifted over the sliders 22. Each of the sliders 22 will be pushed out the slider chamber 213 again by the resilient member 23 until the supporting end portion 221 is protruded out of the slider chamber 213 again. And then, the switching rod 122' is supported by the protruded supporting end portions 221 of the sliders 22 of the two switch devices 20, such that the switching rod 122' are not able to push the sliders 22 back but to apply its weight on the sliders 22. So, the folding arms 12' are unfolded and stably supported by the switch devices 20. Accordingly, the foldable supporting frame 10' is in the unfolded mode as well. The container body 30' is capable of being placed on the folding arms 12'.

Correspondingly, by unfolding the folding arms 12' or the supporting legs 13' of the foldable supporting frame 10', the folding arms 12' are supported by the switch devices 20 stably while the switching rod 122' is capable of bearing the container body 30'.

Figure 10A:
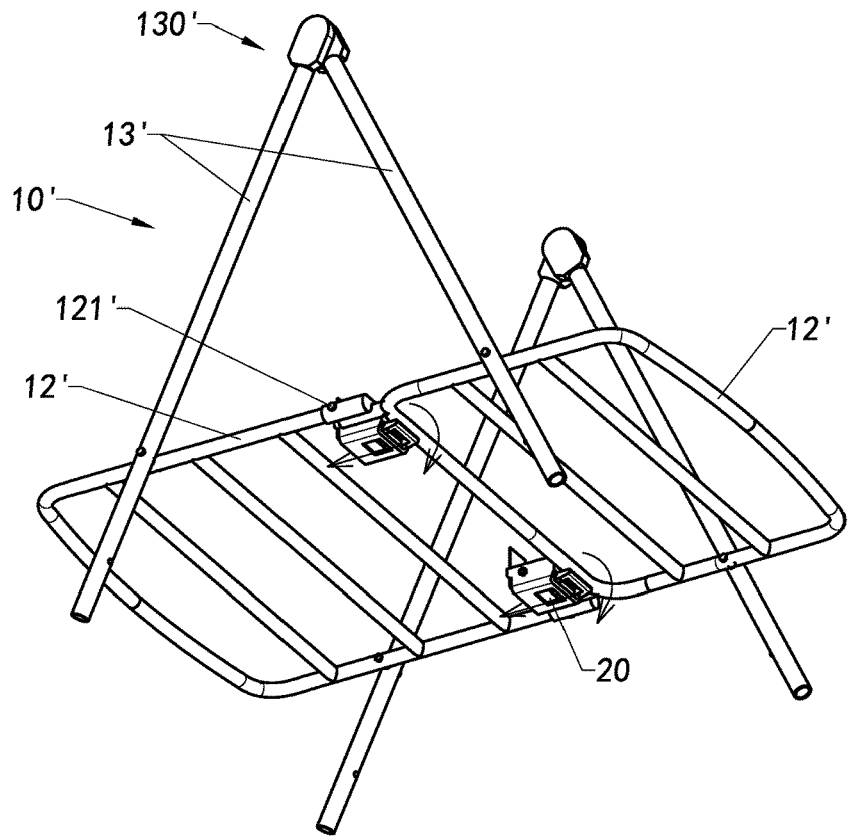
FIG. 10A to FIG. 10B are perspective views illustrating the folding operation of the foldable liquid container according to the alternative mode of the above preferred embodiment of the present invention.
Figure 10B:
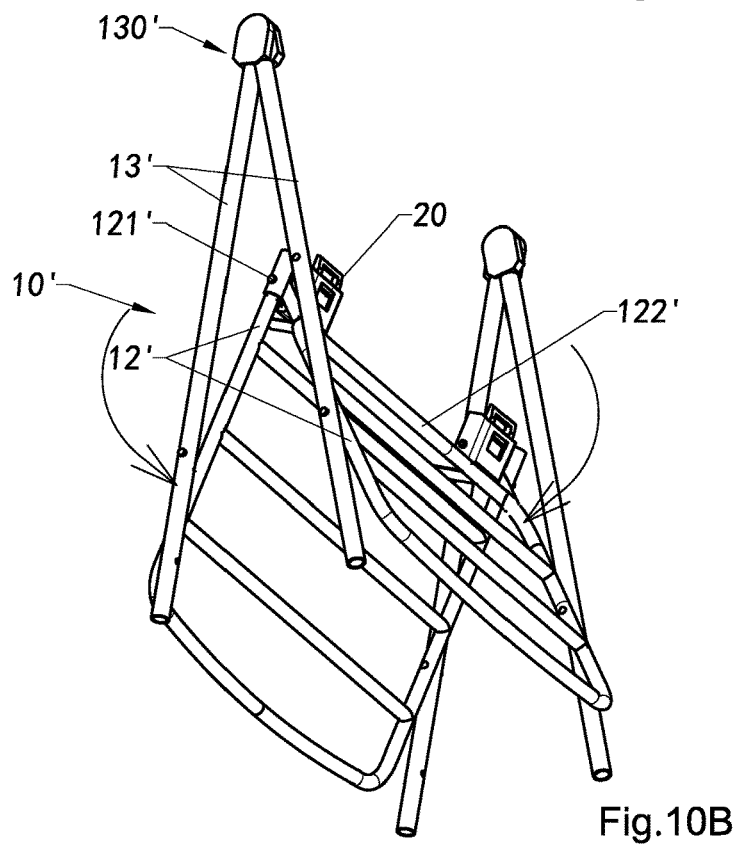

In addition, the relationship and movement of the folding of the foldable liquid container according to the alternative mode of the preferred embodiment are illustrated in FIG. 10A to FIG. 10B

To unfold the folding arms 12', the supporting end portions 221 of the sliders 22 substantially support the switching rod 122' and bear the weight of the switching rod 122' while preventing the sliders 22 from pushing back into the slider chambers 213 respectively. In order to fold up the foldable liquid container, simply by pulling the pulling member 24' to push the sliders 22 to move back inside the slider chambers 213 to compress the resilient members 23 respectively, the switching rod 122' of the folding arms 12' will lose support by the supporting end portions 221 of the sliders 22 such that the folding arms 12' will fall down and rotate about the pivot rod 121'. In other words, one of folding arms 12' will drop down and rotate about the pivot rod 121' that drives the supporting legs 13' to rotate about the pivotal shaft 130' too. In other words, the supporting legs 13' are rotated to fold up with the folding arms 12' together.

In view of above, simply by pulling the pulling members 24 to operate the switch devices 20, the folding arms 12' lost their support by the switch devices 20. Then, the folding arms 12' can thus be folded up due to gravity, the supporting legs 13' are folded up following the folding up of the folding arms 12'. Accordingly, the foldable liquid container can be folded up by a single pulling operation.

In another alternative mode of the preferred embodiment, the two pulling members 24 can be connected together in an end-to-end manner, so that only one of the pulling members 24 is needed to operate the two switch devices 20, and the two ends of the two pulling members 24 are securely fastened on the sliders 22 respectively, wherein by pulling one pulling member 24, both switch devices 20 can be operated simultaneously.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable liquid container, comprising:
   a foldable supporting frame arranged to be operated between an unfolded mode and a folded mode;
   a switch device arranged on said foldable supporting frame to operate said foldable supporting frame between the unfolded mode and the folded mode by a single pulling operation; and
   a container body arranged on said foldable supporting frame, wherein said container body is constructed to be folded up with a folding of said foldable supporting frame and unfolded with an unfolding of said foldable supporting frame, wherein when said foldable supporting frame is unfolded, said foldable supporting frame is supported in the unfolded mode by said switch device, wherein said switch device is able to be operated to release the support of said foldable supporting frame when said foldable supporting frame is operated from the unfolded mode to the folded mode.

2. The foldable liquid container, as recited in claim 1, wherein said switch device is coupled with said container body in such a manner that said foldable supporting frame is able to be folded up by the single pulling operation applied on said container body.

3. The foldable liquid container, as recited in claim 1, wherein said container body is coupled with said foldable supporting frame in such a manner that said container body is able to be unfolded with an unfolding of said foldable supporting frame.

4. The foldable liquid container, as recited in claim 3, wherein said foldable supporting frame comprises two folding arms pivotally connected with each other through said switch device such that said two folding arms are able to be pivotally rotated about said switch device for folding and unfolding, wherein said foldable supporting frame comprises two folding arms and at least four supporting legs, wherein each of said two folding arms is supported by and linked with two of said supporting legs, such that said supporting legs are able to be operated to fold and unfold following the folding and unfolding of said two folding arms.

5. The foldable liquid container, as recited in claim 4, wherein said foldable supporting frame further comprises a pivotal shaft which pivotally connects said supporting legs with said two folding arms, wherein when said two folding arms are rotated to between the folded mode and the unfolded mode, said supporting legs are driven by said two folding arms to rotate about said pivotal shaft to fold or unfold correspondingly.

6. The foldable liquid container, as recited in claim 4, wherein said foldable supporting frame further comprises a switching rod which is mounted on two ends of one of said two folding arms in such a manner that said switching rod is able to be supported by said switch device to limit movement between said two folding arms of said supporting frame in the unfolded mode.

7. The foldable liquid container, as recited in claim 6, wherein said foldable supporting frame further comprises a pivot rod to pivotally connect said two folding arms such that said two folding arms are able to be rotated about said pivot rod to fold and unfold said foldable supporting frame.

8. The foldable liquid container, as recited m claim 7, wherein said pivot rod is mounted on said switch device.

9. The foldable liquid container, as recited in claim 7, wherein one of said two folding arms is fixed on said switch device as a fixed arm while the other of said two folding arms is rotatable about said switch device with respect to said fixed arm as a free arm, wherein said free arm is movably supported on said switch device around said pivot rod.

10. The foldable liquid container, as recited in claim 9, wherein said switching rod is transversely connected between two ends of said free arm such that when said two folding arms are unfolded, said switching rod is supported by said switch device and said free arm is unfolded to be on the same plane with said fixed arm.

11. The foldable liquid container, as recited in claim 10, wherein said switch device is operable to release the support of said switching rod such that when said switch is operated to release said switching rod, said free arm is able to fall down and rotate about said pivot rod due to gravity towards said fixed arm in order to fold up said free arm and said fixed arm.

12. The foldable liquid container, as recited in claim 10, wherein said switch device comprises a main body having a slider chamber, a slider slidably mounted in said slider chamber of said main body and a resilient member received in said slider chamber to apply a pushing force against said slider to normally keep a supporting end portion of said slider being protruded out of said main body.

13. The foldable liquid container, as recited in claim 12, wherein said main body is structured and shaped to connect said two folding arms in a foldable manner.

14. The foldable liquid container, as recited in claim 12, wherein said free arm is rotatably connected to said main body and said fixed arm is securely connected to said main body.

15. The foldable liquid container, as recited in claim 14, wherein said main body has two fixed arm chambers and two free arm chambers, wherein two end portions of said fixed arm are fastened inside said two fixed arm chambers by said pivot rod respectively, wherein two end portions of said free arm are extended in said two free arm chambers and pivotally connected by said pivot rod such that said free arm is able to be rotated to fold and unfold about said pivot rod with respect to said fixed arm.

16. The foldable liquid container, as recited in claim 15, wherein said supporting end portion of said slider has an inclined shape adapted for supporting said switching rod to bear a weight of said switching rod without being pushed back into said slider chamber.

17. The foldable liquid container, as recited in claim 16, wherein said slider comprises a pulling portion securely connected to a pulling member, wherein one end of said pulling member is connected to a handle disposed on said container body while another end of said pulling member is connected to said pulling portion of said slider, wherein said switch device is operated by pulling said handle to fold up said foldable supporting frame.

18. The foldable liquid container, as recited in claim 17, wherein by pulling said pulling member, said supporting end portion of said slider is moved back into said slider chamber to compress said resilient member to release the support of said folding arms so as to fold up said foldable supporting frame.

19. The foldable liquid container, as recited in claim 17, wherein said foldable supporting frame further comprises a pair of lengthening legs which are detachably connected to bottom ends of said four supporting legs respectively for further raising a height of said container body.

20. The foldable liquid container, as recited in claim 17, wherein said container body comprises a surrounding wall and a bottom base sealedly connected with said surrounding wall to shape said container body in bowl shape, wherein said bottom wall has an outlet for discharging liquid contained inside said container body.

* * * * *